United States Patent [19]

Hunsicker, Jr.

[11] Patent Number: 5,050,732

[45] Date of Patent: Sep. 24, 1991

[54] PACKAGING FOR COMPONENTS HAVING FLEXIBLE LEADS

[76] Inventor: Harry E. Hunsicker, Jr., 7806 Nauiton Ct., Hanover, Md. 21076

[21] Appl. No.: 503,917

[22] Filed: Apr. 4, 1990

[51] Int. Cl.⁵ .............................................. B65D 73/02
[52] U.S. Cl. ................................... 206/332; 206/329; 206/331; 206/470; 206/486; 220/339
[58] Field of Search .............. 206/328, 329, 331, 332, 206/461, 470, 303, 486, 488, 490, 388, 562-564; 220/339, 307

[56] References Cited

U.S. PATENT DOCUMENTS

| 2,962,161 | 11/1960 | Lacy | 206/331 X |
|---|---|---|---|
| 3,088,587 | 5/1963 | Dimmig et al. | 206/331 |
| 3,360,135 | 12/1967 | Horecki | 206/328 X |
| 3,490,192 | 1/1970 | Regan, Jr. | 53/430 |
| 3,650,430 | 3/1972 | Siegmar et al. | 206/329 X |
| 4,216,860 | 8/1980 | Heimann | 206/565 X |
| 4,676,446 | 6/1987 | Ciocarelli et al. | 206/470 X |
| 4,709,297 | 11/1987 | Walther | 206/328 |
| 4,867,308 | 9/1989 | Crawford et al. | 206/334 X |

FOREIGN PATENT DOCUMENTS

| 3441445 | 5/1985 | Fed. Rep. of Germany | 206/328 |
|---|---|---|---|
| 2076594 | 12/1981 | United Kingdom | 206/328 |

*Primary Examiner*—Bryon P. Gehman
*Attorney, Agent, or Firm*—Peter L. Klempay

[57] ABSTRACT

Components such as fiber optic devices which have elongate, flexible leads subject to damage if kinked or otherwise mishandled are packaged in a container of molded plastic construction having a first recess in which the body portion of the component is retained and a second, circular recess in which the leads are wound. The bottom wall of the circular recess is provided with spaced holes through which a vacuum is drawn to advance the leads into this recess in the packaging process.

6 Claims, 3 Drawing Sheets

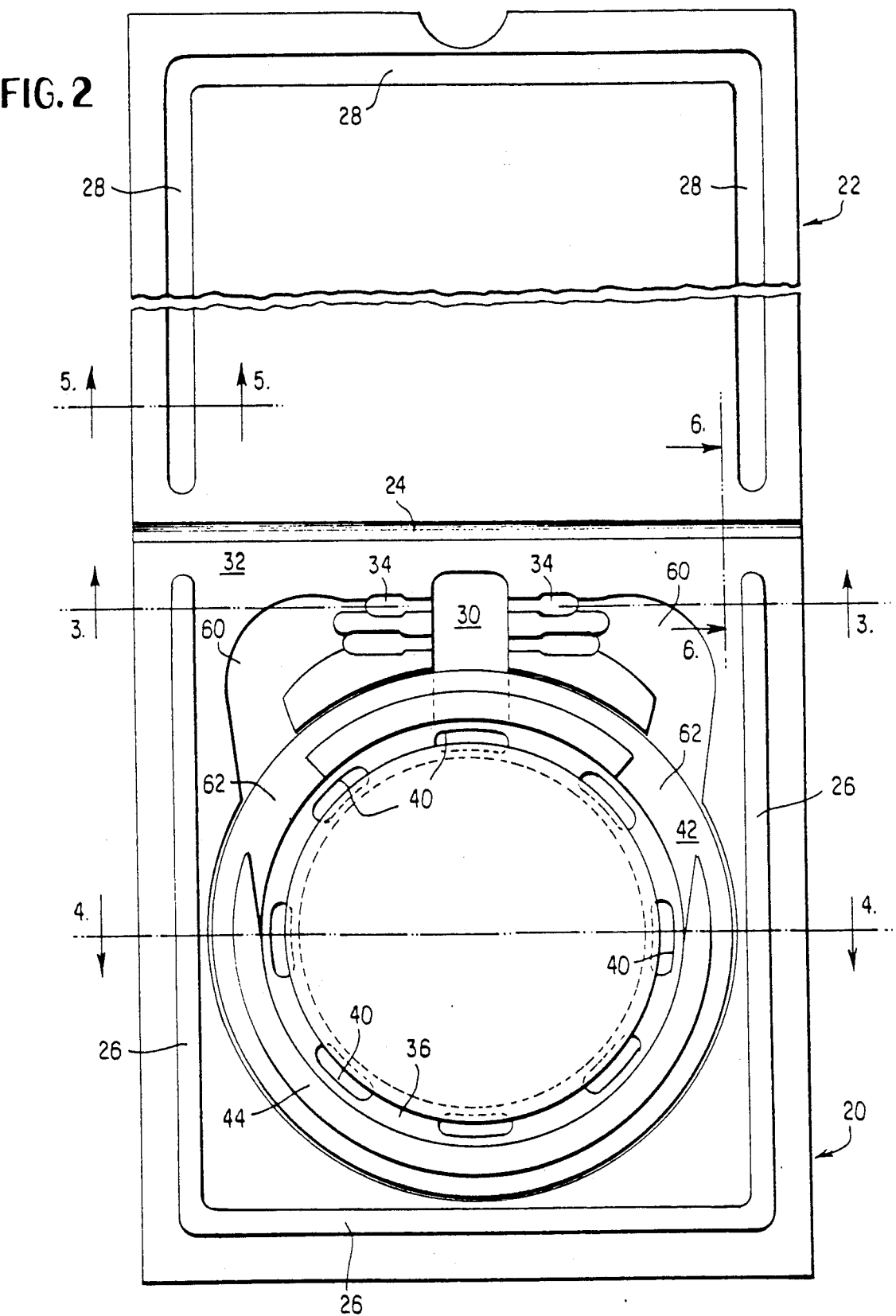

PACKAGING FOR COMPONENTS HAVING FLEXIBLE LEADS

The present invention pertains to the packaging of components such as fiber optic devices which have elongate, flexible leads and, more particularly, to packaging arrangements in which such leads are efficiently placed and retained in an orderly array.

BACKGROUND OF THE INVENTION

A number of electronic and fiber optic components include a body portion and elongate, flexible leads extending therefrom. In the packaging of such components it is necessary to contain the leads in an orderly manner to prevent damage to the leads. Fiber optic leads, in particular, must be packaged in a way which avoids the formation of sharp bends or kinks in the leads and which avoids tangling of the leads. Manual packaging of such components, while potentially effective in preventing damage to the component leads, is an added expense.

The requirement that the component leads be arranged without sharp bends or kinks necessitates the use of a relatively large size container, particularly when the leads are of substantial length. This, again, represents an expense, both in terms of packaging material and in space requirements in storage and shipping of the packaged components.

It is a primary object of the present invention to provide for the packaging of components having elongate, flexible leads in a manner which maintains the leads in an orderly and undamaged configuration.

It is also an object of the present invention to provide packaging for such components which utilizes a relatively compact container.

A further object of the invention is the provision of such packaging which permits the use of automated packaging techniques.

SUMMARY OF THE INVENTION

The above and other objects of the invention which will become apparent hereinafter are achieved by the provision of a container for packaging a fiber optic or other component of the type having a body portion and elongate, flexible leads extending therefrom which container is of molded plastic construction and includes cover and base panels connected by an integral hinge, the base panel having a first recess for retaining the body portion of the component, a second, annular recess adjacent the first recess for receiving the component leads, and third recesses interconnecting the first and second recesses along smoothly curving paths. The bottom wall of the annular recess is provided with spaced holes which are brought sequentially into communication with a vacuum source to draw the free ends of the leads into the annular recess, thereby coiling the leads around the inner wall of this recess. First and second annular flanges secured adjacent the radially outer and inner sides of the annular recess, respectively, together form a cover therefor.

For a more complete understanding of the invention and the objects and advantages thereof, reference should be had to the accompanying drawings and the following detailed description wherein a preferred embodiment of the invention is illustrated and described.

DESCRIPTION OF THE DRAWINGS

In the drawings:

FIG. 2 is a plan view of the container of the present invention;

DESCRIPTION OF THE PREFERRED EMBODIMENT

Figure 1:
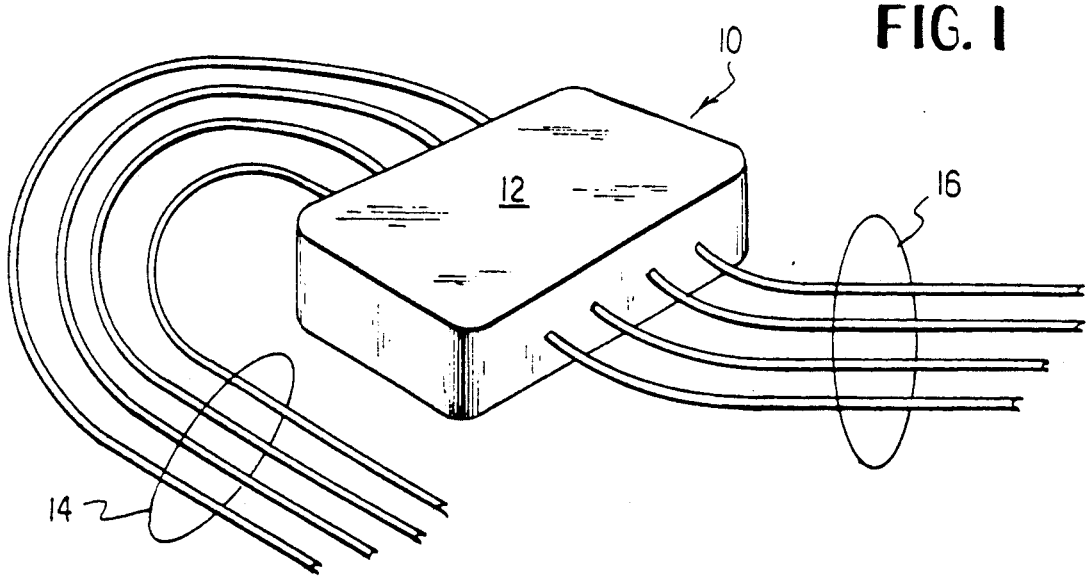
FIG. 1 is a perspective view of a fiber optic component.
Figure 3:
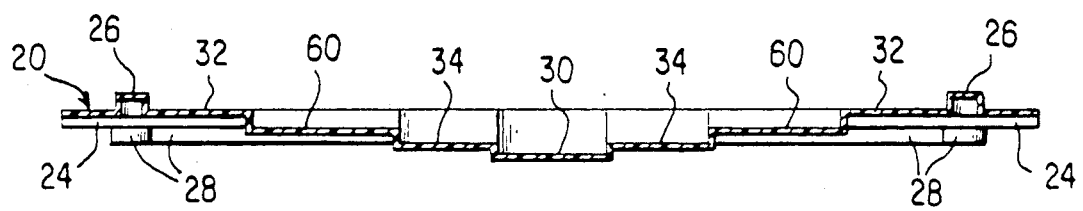
FIGS. 3 and 4 are transverse cross sectional views taken on the lines 3—3 and 4—4. respectively, of FIG. 2.
Figure 4:
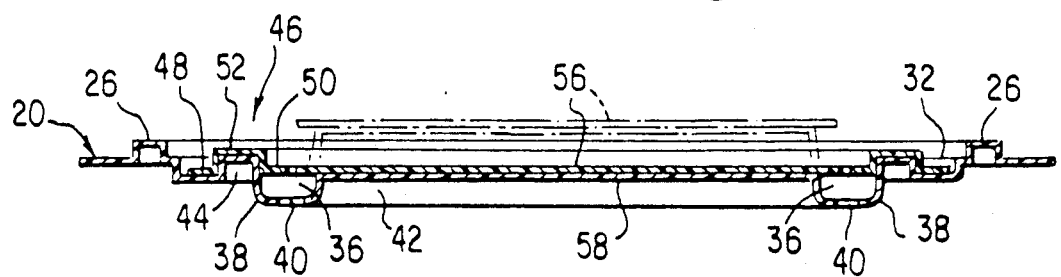
Figure 5:
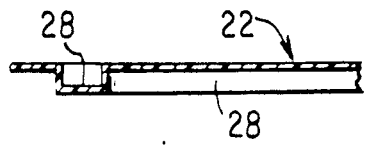
FIGS. 5 and 6 are fragmentary transverse cross sectional views taken on the lines 5—5 and 6—6, respectively, of FIG. 2.
Figure 6:
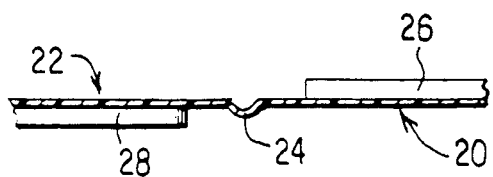

A typical fiber optic component 10 includes, as is shown in FIG. 1, a body portion 12 in which are housed the active elements of the component and a plurality of elongate, flexible leads 14 and 16 extending from the body portion for connection with other components and circuits. As has been mentioned above, these leads, which are filaments of glass or other light conducting material, are relatively fragile and subject to damage if kinked or otherwise roughly handled.

The container of the present invention used in packaging the fiber optic component, or a similar electronic component, is illustrated in FIGS. 2 through 6. The package is, preferably, of vacuum thermoformed plastic construction and includes a base panel 20 and a id panel 22 which are joined by an integral hinge 24. An upwardly projecting ridge 26 extends along the three sides of the base panel remote from the hinge with a complementary groove 28 being provided in the lid panel, the ridge and groove forming a friction fit closure for the package.

A first recess 30 in the base panel is configured to receive the body portion 12 of the fiber optic device, the length and width of the recess being substantially equal to those of the device so as to provide a snap fit retaining the device therein with the depth of the recess from the principal surface 32 of the base panel being approximately equal to the thickness of the device. One or more second recesses 34 extend outwardly from opposite sides of the recess 30 at locations corresponding to the points at which the leads 14, 16 exit from the device body portion 12 and are of sufficient depth as to receive the leads. Adjacent to the first recess is a third, circular recess 36 the bottom wall 38 of which is provided with holes 40 uniformly spaced therearouund. The depth of the recess 36 is greater than that of the first recess and the arcuate bottom wall 38 is of sufficient flexibility as to allow upward movement of the inner wall 42 of the recess 36. Concentrically surrounding the circular recess 36 is a fourth, also circular recess 44 spaced radially outwardly therefrom so as to provide a circular, upwardly projecting ridge 46 at the circumference of the recess 36. The recess 44 and ridge 46 serve to locate and retain a ring 48 having outer and inner flanges 50 and 52, respectively, joined by a midportion 54 of complementary configuration to the ridge 46, the outer flange 50 being received in the recess 44 and the inner flange 52 overlying the radially outward half of the circular recess 36. A circular p)ate 56 is attached to the central wall portion 58 defined by the recess 36, the plate being concentric with the recess 36 and of such diameter as to project outwardly, providing a flange 57 overlying the radially inner half of the recess 36 thus forming, with the flange 50, a cover for this recess. The ring 48 and plate 56 are secured to the base panel 22, preferably being heat sealed thereto. Extensions 60 of the second, lead receiving recesses 34 connect these recesses to the circular recess 36 along smoothly curving paths which extend tangentially into the recess 36, the ridge 46 of the base plate and the midportion 54 of ring 48 being interrupted, as indicated by the numeral 62, at the juncture of the extensions 60 and the circular recess 36.

The fiber optic device may be packaged manually or automatically. Manual packaging involves inserting the component body portion 12 into the first recess 20, raising the center portion of the base panel to separate the plate 56 from the flange 52 thus providing access to the inner wall 42 of the recess 36 and coiling the leads 14 and 16 about this wall.

Figure 9:
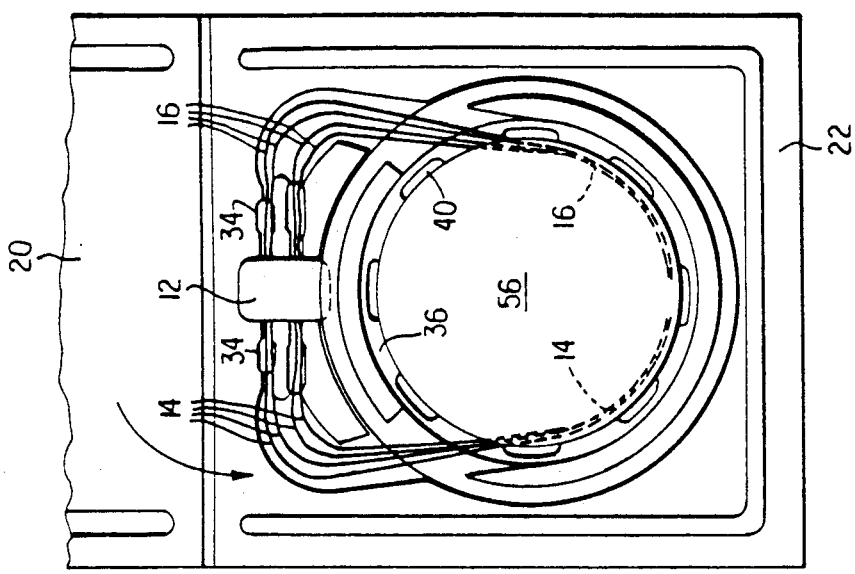
FIGS. 7, 8 and 9 are schematic showings of the sequence of steps performed in packaging of a component in the container of the present invention.
Figure 8:
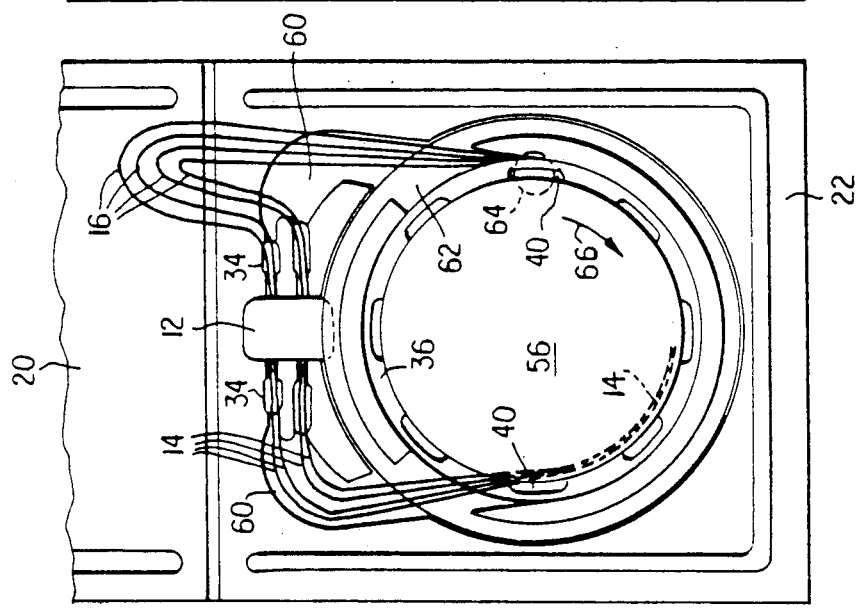
Figure 7:
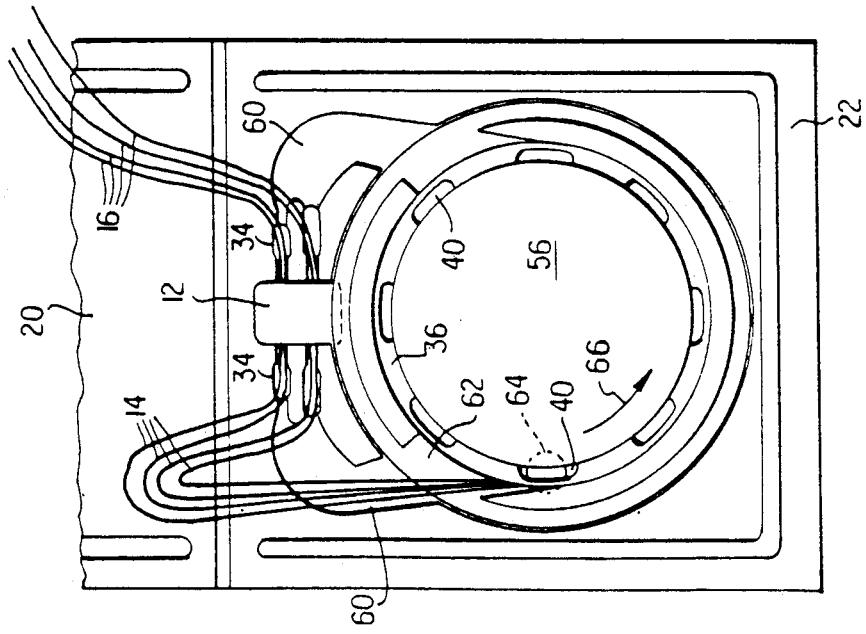

The sequence of steps in the automated packaging a flexible lead component in the container of the present invention is shown schematically in FIGS. 7-9. The body portion 12 of the component is first snapped into the recess 30 with the leads 14, 16 extending outwardly through the recesses 34. The free ends of the first set of leads 14 are then placed at the juncture of the flange 52 and plate 56 overlying the recess 36 and in alignment with the recess extensions 60, passing through the gap 62. The container is positioned on a support surface having a vacuum port 64 with the bottom surface of the container base panel in contact with the surface and the vacuum port 64 in communication with the one of the holes 40 adjacent the entry gap 62. As the base panel 20 is pressed onto the support surface, the inner wall 42 of the circular recess 36 and the plate 56 move upwardly by a short distance relative to the remainder of the base panel, creating an annular opening between the plate 56 and the flange 52. A vacuum is drawn through the port 64 to draw the free ends of the leads 14 into the circular recess. By relative rotation of the container relative to the vacuum port, as indicated by the arrow 66, successive ones of the holes 40 are brought into communication with the vacuum port thus advancing the leads 14 into the recess 36 and winding them about the inner wall 42. When the leads 14 have been drawn fully into the recess, as shown in FIG. 9, the process is repeated with the second set of leads 16, these leads being wound in the opposite direction about the wall 42. Thereafter, the lid panel 20 is closed onto the base panel 22, completing the packaging operation.

The present invention provides for the packaging of flexible lead components in an efficient and compact manner. The recesses 34 and recess extensions 60 offer smooth transitions for the leads between the component body retaining recess 30 and the circular recess 36 in which the principal lengths of the leads are stored in an orderly fashion.

While a preferred embodiment of the invention has been illustrated and described in detail, it will be apparent that changes and additions may be had therein and thereto without departing for the spirit of the invention. Reference should, accordingly, be had to the appended claims in determining the true scope of the invention.

I claim:

1. A container for a component having a body portion and elongate flexible leads extending therefrom comprising:

a base panel having a first recess configured to receive the body portion of the component, a second recess, and a third, circular recess adjacent said first recess, said third recess having side walls of greater depth than the remainder of said base panel and a bottom wall of sufficient flexibility as to permit upward movement of the inner one of said side walls, said bottom wall being provided with holes at spaced intervals therearound, said second recess extending from said first recess along a curving path meeting said third recess tangentially, said second and third recesses being configured to receive the leads of the component in an orderly fashion;

a first flange attached to said base panel and projecting radially inwardly over the outer portion of said third recess;

a second annular flange attached to said base panel and projecting radially outwardly over the inner portion of said third recess to form, with said first flange, a cover for said third recess; and a cover panel formed integrally with said base panel and connected thereto by an integral hinge.

2. The container of claim 1 wherein said base and cover panels are of unitary molded plastic construction.

3. The container of claim 1 further including an upwardly projecting annular ridge concentric with and radially outwardly of said third recess, said ridge being interrupted at said second recess and said first flange having a groove of complementary configuration to said ridge to thereby locate said first flange.

4. The container of claim 3 wherein said base and cover panels are of unitary molded plastic construction.

5. A container for a component having a body portion and elongate flexible leads extending therefrom comprising:

a base panel having a first recess configured to receive the body portion of the component, a second recess, and a third, circular recess adjacent said first recess, said third recess having a bottom wall provided with holes at spaced intervals therearound, said second recess extending from said first recess along a curving path meeting said third recess tangentially, said second and third recesses being configured to receive the leads of the component in an orderly fashion;

a first flange attached to said base panel and projecting radially inwardly over the outer portion of said third recess;

a second annular flange attached to said base panel and projecting radially outwardly over the inner portion of said third recess to form, with said first flange, a cover for said third recess; and a cover panel formed integrally with said base panel and connected thereto by an integral hinge.

6. The container of claim 5 wherein said base and cover panels are of unitary molded plastic construction.

* * * * *